Oct. 25, 1955    L. A. TAYLOR    2,721,363
BLOW TUBE FOR SHELL MOLDING
Filed Oct. 14, 1952

Inventor
Lewis A. Taylor
By Willits, Helmig & Baillio
Attorneys

United States Patent Office 2,721,363
Patented Oct. 25, 1955

2,721,363

BLOW TUBE FOR SHELL MOLDING

Lewis A. Taylor, Bedford, Ind., assignor to General Motors Corporation, Detroit, Mich., a corporation of Delaware Application October 14, 1952, Serial No. 314,631

7 Claims. (Cl. 22—36)

This invention relates to a blow tube for sand blowing operations and particularly to a blow tube which is especially adapted for use in blowing shell molds having a low binder content.

Recently developed techniques in foundry practice employ thin-walled dispensable molds and cores composed of sand and plastic binders. These procedures, generally referred to as "shell molding" processes, are particularly suited for the production of precision castings in a wide variety of metals. Essentially the shell molding process consists of using thermosetting plastic or resin as a binder for the sand grains to form rigid molds having high gas permeability, good surface smoothness and dimensional stability. The molding material, which is generally a dry mixture of a major proportion of silica sand and a minor proportion of a plastic binder is used in a powdered form with no water being added. Phenol formaldehyde and melamine formaldehyde resins are typical examples of the type of thermosetting binders preferably used. It is desirable that the sand employed be free of metal oxides, clay, moisture and organic matter.

These sand-resin molds are prepared by allowing the dry mixture of sand and resin powder to come into contact with a hot metal pattern for a short period of time. A layer of the mix adheres to the metal surfaces due to the heating of the resin which entraps the sand with which it is intimately mixed, thereby accurately reproducing pattern details. Metal patterns must be employed because they are subjected to elevated temperatures. Pattern temperatures in the range between 250° F. and 350° F. are typical, but temperatures up to 600° F. may be advantageously employed under particular conditions. The half patterns, gate and runner are usually all permanently fixed on metal plates. The pattern temperatures and the length of time the molding material is allowed to remain in contact with the hot pattern surfaces determine the resulting thickness of the mold. Mold build-up times ranging from a few seconds to approximately one minute are appropriate for various applications.

After this short time interval, the excess dry sand and resin are removed, and the closely adhering sand-resin layer is preferably cured by heating to a temperature within the range of approximately 300° F. to 1300° F. for a short period of time, usually from a few seconds to five minutes, while in contact with the metal pattern. This baking operation results in the conversion of the resinous material to a hard insoluble binder which securely bonds the sand grains together. After the removal of the pattern and the mold from the curing oven, the mold is stripped from the pattern. The formed molds are, in effect, thin shells which possess sufficient strength and stiffness to make them suitable for many casting operations.

Heretofore, mold blowing and core blowing apparatus used in the shell molding process have employed cylindrical blow tubes having unobstructed passages. Satisfactory results are obtained with such blow tubes so long as the resin content is sufficiently high to prevent the molding mix from continuing to drop through the blow tubes upon cutting off the air supply. A sand-resin mix containing between 6% and 15% by weight of binder has been conventionally used.

However, with the recent introduction of shell molding mixes having a reduced resin content, it was found that, when the air supply was shut off after the blowing operation, the sand continued to seep down through the blow tubes and accumulate on the top of the formed mold. Needless to say, this excess molding material not only resulted in a waste of the molding medium but in some instances also caused an uneven sand-resin build-up upon the surface of the mold.

Accordingly, a principal object of the present invention is to provide an improved blow tube adapted to be incorporated in mold blowing and core blowing machines for forming shell molds. A further object of the invention is to provide such a blow tube which permits a sand-resin mix having a binder content as low as 3% by weight to be conveniently used by retaining the molding mix within the blow tube and preventing it from dropping onto the blow mold upon shutting off the air supply. This blow tube is also adapted to be successfully used with sand-resin mixtures having a binder content as high as 20% by weight.

A still further object of the present invention is to provide a blow tube in which coarser sands may be employed and retained within the blow tube after the cessation of blowing operations. In other words, the present invention provides a blow tube which is applicable for use with sands and sand-resin mixtures having a low angle of repose.

It will be understood that the term "mold," as used herein, is applied in its generic sense to mean a casting form which includes both molds and cores, this invention in no manner being limited to the former. Similarly, unless otherwise indicated, the word "pattern" is used herein as including both mold patterns and core boxes.

Other objects and advantages of this invention will more fully appear from the following description of a preferred embodiment of the invention shown in the accompanying drawing, in which.

Figure 1:
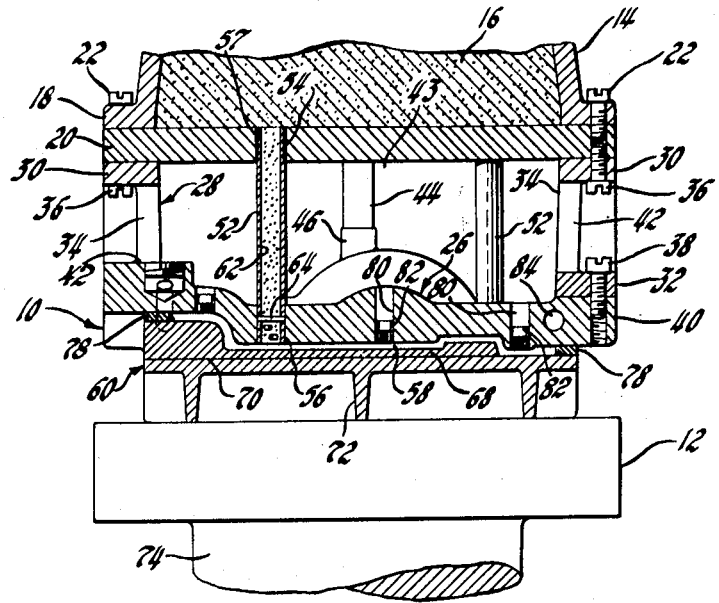
Figure 1 is a vertical sectional view, with parts broken away, of a mold blowing machine embodying the invention.

Referring more particularly to the drawing, Figure 1 shows a blowhead assembly, indicated generally by 10, positioned between a pattern rest table 12 and a traverse mechanism, not shown, of a conventional core blowing machine. An upwardly tapered magazine 14 for containing a sand-resin molding mixture 16 of the type hereinbefore described is located immediately beneath the traverse, this magazine preferably being constructed of a pair of channel-shaped castings which are bolted together along vertical flanges, not shown. The magazine has its upper end provided with an opening through which the sand-resin mix and compressed air may be introduced into the magazine.

The bottom of the magazine is shown as provided with outwardly extending flanges 18, which are secured to a horizontal metallic plate 20 by screws or studs 22. The plate 20 functions as the upper wall of the blowhead assembly and as the lower wall of the magazine. A suitable quantity of the sand-resin mixture 16 is contained in the magazine prior to the actual blowing operation.

A blowhead 26, which is actually a female pattern plate for the mold, is secured beneath the plate 20, and is spatially separated therefrom by a spacer or air escape frame, indicated generally by 28. This frame is shown as including a pair of spaced peripheral flange portions 30 and 32 which abut the adjacent surfaces of the plate 20 and the blowhead 26, respectively, near the outer edges thereof. These flanges portions are connected by vertically extending supporting or spacing struts 34, the flanges 30 being secured to the plate 20 by screws 36 or other suitable means, and the flanges 32 in turn being similarly attached, as by screws 38, to the flat edge portions 40 of the blow-head plate 26. This construction provides a blowhead assembly with a high degree of structural rigidity and, at the same time, provides openings 42 between the vertical supporting struts 34. These openings function as air escape ports to permit the air which is displaced by the sand-resin mix during the blowing operation to pass from the space 43 in the blowhead assembly to the atmosphere.

Tubular supports 44 are affixed to the lower surface of the plate 20 and extend downwardly into annular flanges or lugs 46 formed on the upper surface of the blowhead 26, the supports 44 being securely attached to these lugs. This rigid construction is desirable to prevent any possible distortion of the portion of the blowhead plate 26 which is adjacent the very hot pattern on which the shell mold is formed and which comes in contact with the heated sand-resin mixture.

A plurality of generally cylindrical blow tubes 52, which are preferably formed of steel tubing, also interconnect and extend through plate 20 and the blowhead 26. The upper ends of the blow tubes are press fitted into apertures 54 which are drilled and countersunk in the plate 20, while the lower ends of the blow tubes are similarly fitted into openings 56 drilled in the blowhead. If desired, a rubber sleeve or collar 57 may be securely bonded to the upper or inlet end of each blow tube to provide a more air-tight joint between the tubes and the plate 20. The blow tubes function to conduct the sand-resin molding mix from the magazine to the mold-forming cavity 58 formed between the blowhead and the metallic pattern plate, indicated generally by 60, these tubes being located at appropriate positions to allow for the proper distribution of the molding mix. Of course, the distribution of the tubes is dependent upon the shape of the casting to be ultimately formed.

The blow tubes 52 communicate with the cavity 58 through the unheated blowhead, thereby precluding the possibility of the sand-resin molding material fusing within these tubes and obstructing the passage of fresh molding mix. In order to further aid in preventing plugging of the blow tubes with the molding material, the longitudinally extending openings or passages 62 through these tubes are preferably slightly tapered toward their inlet ends.

Figures 2, 3:
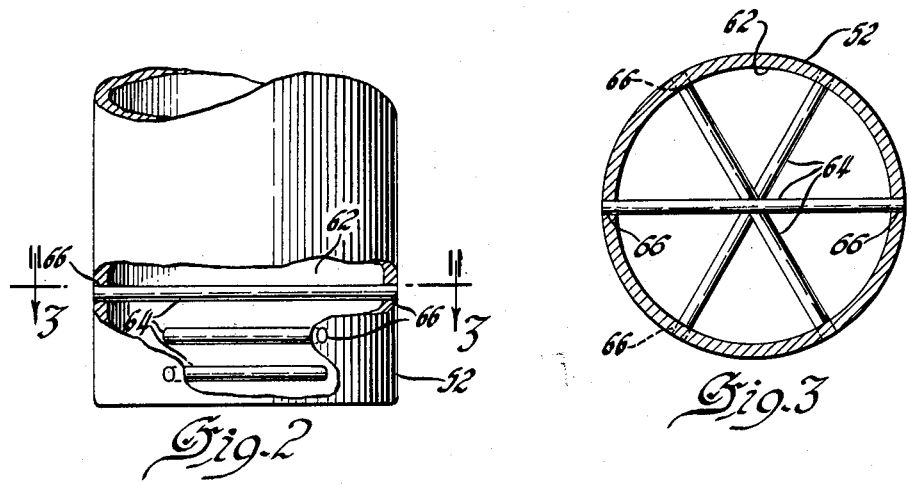
Figure 2 is an enlarged fragmentary view, with parts broken away and in section, showing the internal structure of the blow tube.
Figure 3 is a sectional view generally along the line 3—3 of Figure 2.

As best shown in Figures 2 and 3, a plurality of retaining wires or pins 64 project laterally across the passage 62 through the elongated body portion of each blow tube near the outlet end thereof. The ends of these pins extend through and are securely fitted in holes 66 drilled through the blow tube walls. In the modification shown, the retaining pins, which are spatially separated with respect to the longitudinal axes of the blow tubes, are approximately equally spaced radially. Thus, when three pins are employed, as shown, adjacent pins define acute angles of about 60°. It will be noted that the axial distance between adjacent pins is substantially greater than the largest cross-sectional dimension of any of the particles contained in the molding mix. The retainer pins may be formed of metal or other materials having high abrasion resistance, the necessary rigidity, and adequate strength.

As hereinbefore indicated, the above-described blow tube construction retains the molding mix within the blow tubes and precludes its dropping onto the blown mold upon shutting off the air supply. Thus, this type of blow tube permits the satisfactory use of a relatively inexpensive sand-resin molding mix having a very low binder content.

The pattern 60 is shown as seated on the pattern rest table 12. This pattern is preferably formed of two portions, a mold-contacting or molding face portion 68 and a flat base portion 70. The base of the pattern may be constructed integral with the molding face portion or formed separately and attached thereto, as desired. In the modification of the pattern plate shown, the pattern base is provided wtih downwardly extending supporting flanges 72 which lend the necessary structural rigidity to the pattern under the severe operating conditions, such as high temperatures, to which it is subjected. These flanges also serve to facilitate heating of the pattern before it is introduced into the blowhead assembly and to permit proper cooling of the mold after the pattern is removed from the blowing machine and the mold cured.

A vertically movable shaft or piston 74, which is hydraulically or otherwise suitably actuated, supports the pattern table 12 and functions as a lift to move the table and pattern into and out of operating position beneath the blowhead. When the mold pattern 60 is moved upwardly on the pattern rest table into assembled position beneath the blowhead 28, the mold-forming cavity 58 is provided between the pattern and the blowhead. The size of this cavity is preferably designed so as to regulate the ultimate thickness of the sand-resin mold desired.

In the modification of the machine shown in the drawing, metallic spacer strips 78, which determine the thickness of the mold to be formed, are provided interjacent the pattern and the blowhead. These strips are preferably secured to the pattern plate and, when so secured, constitute the only portions of the pattern assembly which contact the blowhead upon closure of the pattern and blowhead before the sand-resin molding mix is blown. It will be understood, however, that the strips 78 could also be formed integral with either the blowhead or the pattern plate.

The blowhead plate 26, which is preferably made of either aluminum or ferrous metal, is provided with a plurality of air outlet openings 80 to provide an escape path for the air displaced from the cavity 58. As is shown in Figure 1, each of these air outlet openings contains a cup-shaped insert 82 which is provided with small venting holes. The cross-sectional area of these latter holes is sufficiently small to eliminate the possibility of sand grains passing therethrough, thereby preventing the molding material from passing out of the cavity 63 during the blowing operation.

A coolant passage 84 is provided within the blowhead 26 near its outer edges and extends completely around the blowhead in the vicinity of the metallic spacer strips 78. This coolant passage is preferably located adjacent the inner edges of the spacer strips 78, so as to prevent the complete melting and setting of the resinous binder at the very junction of the lower surface of the blowhead and the inner side faces of the strips. Such an arrangement prevents the hot shell mold from adhering too tightly to these corner surfaces and thereby reduces the danger of tearing the mold at these points when the mold is subsequently stripped from the pattern. If the spacer strips are secured to the blowhead, this problem of mold tearing would otherwise be quite troublesome. Water, air or other suitable coolants may be employed for this purpose.

The sequence of operation of the shell mold forming machine is as follows. The heated metal pattern plate 60 is first placed in position on the pattern rest table 12. This is preferably done while the blowhead assembly, which may be supported by any suitable frame structure, is removed from between the traverse mechanism and the pattern rest table 12 and while the magazine is in loading position under a hopper, not shown, containing the dry sand-resin molding mixture to be used. The magazine portion 14 of the blowhead assembly is filled with a suitable amount of the molding material, and the assembly is then laterally moved into position directly under the air supply means. Both the hopper which contains the molding media and the air supply means may be rigidly mounted on the same frame on which the blowhead assembly is slidably secured.

After the blowhead assembly is in its proper position immediately beneath the air supply means and above the pattern rest table 12, the pattern table is elevated by the vertically movable piston 74 to permit the upper faces of the spacer strips 78 to contact the lower surface of the blowhead 26.

When the pattern table, blowhead assembly and air supply means are in assembled position, air is fed into the magazine above the molding mix. This air, which is preferably introduced under approximately 90 pounds per square inch pressure, forces the dry sand-resin molding mix through the blow tubes 52 and into the mold cavity 58 between the hot pattern and the blowhead. In the arrangement shown, the air is not intermixed with the molding material as the latter enters the cavity 58, but instead the compressed air functions as a ram to drive the sand-resin mix into this cavity. The air which is displaced from the mold cavity is forced upwardly through the air vents 80 in the blowhead and into the space 43 between the plate 20 and the blowhead 26. This displaced air then escapes through the air escape ports 42 formed between the spacing struts 34 and out of the blowhead assembly.

Following the blowing operation, a time interval is allowed for the thermosetting resin binder to "set" on the hot pattern, a period of time ranging from a few seconds to approximately one minute being appropriate for various applications. A mold build-up in the order of about 10 seconds is usually adequate, and frequently the resin will set to a sufficient extent during the short blowing period. After the resin has set, the table is lowered and the blowhead returned to its position immediately beneath the hopper. The metal pattern plate 60 is then removed from the rest table and, if desired, the closely adhering sand-resin layer is baked for a short period of time, usually from a few seconds to five minutes in a curing oven while in contact with the pattern. The curing of the formed core is preferably accomplished in a recirculating air oven which is maintained at a temperature between approximately 550° F. and 1300° F.

After the removal of the pattern and the formed mold from the curing oven, the mold is stripped from the pattern, thus completing the operating cycle. Of course, most efficient use can be made of this mold blowing machine if it is kept in operation almost continuously. This may be accomplished by blowing and baking one mold while another one is being stripped from a second pattern plate and readied for use and while still another pattern is being heated.

The magazine 14 is preferably designed to contain more sand-resin mix than is necessary for the formation of the mold, it being desirable in most instances to form this magazine of sufficient size to permit it to remain beneath the air supply means for a multiplicity of shots.

Various modifications in the arrangement and details of the specific embodiment described and shown herein will be apparent to those skilled in the art and are contemplated as within the scope of the present invention as defined in the appended claims.

I claim:

1. A shell mold blowing machine comprising a hot pattern and a blow tube with an elongated tubular body portion having an opening extending therethrough for conveying a molding mixture of dry sand and a thermosetting binder to the molding surface of said hot pattern, said tube being provided with a plurality of retainer pins extending between opposite walls of said tube near its outlet end for preventing passage of the molding mixture through the tube after cessation of the blowing operation.

2. A shell mold blowing machine comprising a heated metallic pattern and a blow tube with a generally cylindrical body portion having a passage extending therethrough for conveying a dry molding mixture of sand and a thermosetting resin powder to said heated metallic pattern, said tube being provided with a plurality of retaining pins projecting laterally across said passage near its outlet end and securely fitted in holes formed in the walls of the blow tube, said retaining pins being spatially separated with respect to the longitudinal axis of the blow tube.

3. In a shell mold blowing machine, a blow tube for conveying a dry sand-resin molding mix from a magazine to a heated metallic pattern, said blow tube having generally cylindrical walls defining a longitudinally extending passage adapted to convey said mix, said passage being slightly tapered toward the inlet end of said tube, the outlet end of said tube being provided with a plurality of angularly disposed metallic pins for retaining the sand-resin molding mix within said tube and magazine after discontinuance of the blowing operation, said pins extending transversely across said passage and having their ends secured to the walls of the blow tube, the distance between said pins with respect to the longitudinal axis of the tube being substantially greater than the largest cross-sectional dimension of the particles contained in the molding mix.

4. In a shell mold blowing machine, a magazine for containing a dry molding mixture of sand and a thermosetting binder, a metallic pattern adapted to be heated, a blow tube extending from said magazine into proximity to said pattern for conveying the molding mixture thereto, and a plurality of retainer pins within the tube transversely extending across the passage through said tube for preventing dropping of the molding mixture onto the pattern after cessation of the blowing operation.

5. In a shell mold blowing machine, the combination of a magazine for containing a dry molding mixture of sand and a thermosetting resin powder, a metallic pattern adapted to be heated above the melting point of said thermosetting resin, and a plurality of blow tubes having generally cylindrical walls defining longitudinally extending openings therethrough for conveying said molding mixture to said pattern, said blow tubes having their inlet ends opening into said magazine and their outlet ends extending into proximity to said pattern, each of said tubes being provided with a plurality of metallic pins laterally extending across the openings in the tube near the outlet ends thereof for retaining the molding mixture within said tubes and magazine after discontinuance of the blowing operation, said pins having their ends extending through the walls of the blow tubes and secured thereto, said pins being approximately equally spaced radially and spatially separated relative to the longitudinal axes of said tubes.

6. In a shell mold blowing machine, the combination of a magazine for containing a dry molding mixture of sand and a thermosetting plastic binder, a metallic pattern heated above the melting point of said binder, a generally transversely extending blowhead plate positioned between and spatially separated from said magazine and pattern, a plurality of hollow blow tubes each extending between said magazine and said blowhead plate and providing a passage for conveying the molding mixture to the pattern, each of said blow tubes having its inlet end communicating with the interior of said magazine and its outlet end extending through said blowhead plate and communicating with a cavity formed between said pattern and said plate, said blow tubes each having a plurality of retainer pins laterally projecting across its passage near the outlet end thereof, said pins being spatially separated with respect to the longitudinal axes of said tubes and having their ends connected to the walls thereof.

7. In a shell mold blowing machine, a magazine for containing a dry molding mixture of sand and a thermosetting binder, a heated pattern, an unheated blow head secured to the outlet end of said magazine between said magazine and said pattern, said blowhead having portions spatially separated from said pattern to form an interjacent mold cavity therewith, and a plurality of blow tubes for conveying the molding mixture from said magazine to said mold cavity, said blow tubes extending from the outlet end of said magazine through said blowhead to said mold cavity, said blow tubes each being provided with a plurality of retainer pins within the tube extending transversely across the passage through said tube for preventing dropping of the molding mixture onto the pattern after cessation of the blowing operation, said pins being located adjacent the outlet ends of said tubes.

References Cited in the file of this patent

UNITED STATES PATENTS

| | | |
|---|---|---|
| 1,839,494 | Pardee | Jan. 5, 1932 |
| 2,486,200 | O'Connor | Oct. 25, 1949 |
| 2,578,223 | Brunner | Dec. 11, 1951 |
| 2,607,968 | Peterson | Aug. 26, 1952 |
| 2,637,881 | Peterson | May 12, 1953 |

OTHER REFERENCES

FIAT Final Report No. 1168, pages 1–4.